Sept. 13, 1966   H. HILDEBRAND   3,273,080
HIGH-FREQUENCY TRANSMISSION LINE HAVING PLURAL COAXIAL
CONDUCTORS OF DIFFERENT EFFECTIVE LENGTH BETWEEN
SOURCE AND SINK
Filed Aug. 6, 1963   2 Sheets-Sheet 1

INVENTOR.
Helmut Hildebrand
BY
ATTORNEY

Sept. 13, 1966                    H. HILDEBRAND                    3,273,080
          HIGH-FREQUENCY TRANSMISSION LINE HAVING PLURAL COAXIAL
              CONDUCTORS OF DIFFERENT EFFECTIVE LENGTH BETWEEN
                              SOURCE AND SINK
Filed Aug. 6, 1963                                       2 Sheets-Sheet 2

INVENTOR.
Helmut Hildebrand
BY
ATTORNEY

United States Patent Office 3,273,080
Patented Sept. 13, 1966

3,273,080
HIGH-FREQUENCY TRANSMISSION LINE HAVING PLURAL COAXIAL CONDUCTORS OF DIFFERENT EFFECTIVE LENGTH BETWEEN SOURCE AND SINK
Helmut Hildebrand, Langenhagan, Hannover, Germany, assignor to Hackethal Draht- und Kabel-Werke Aktiengesellschaft, Hannover, Germany, a corporation of Germany
Filed Aug. 6, 1963, Ser. No. 300,337
11 Claims. (Cl. 333—26)

This invention pertains to transmission lines and more particularly to symmetrical high-frequency transmission lines.

Quite often in the transfer of high-frequency electromagnetic energy it is necessary to connect an unbalanced element to a balanced element. For example, the source of high-frequency electromagnetic energy may be unbalanced with respect to ground while the load may be balanced with respect to ground, or vice-versa. A direct connection of an unbalanced element to a balanced element generally changes the electrical properties of the elements and introduces discontinuities which adversely affect the quality and efficiency of the transmission.

Accordingly, many devices such as baluns and line-balance converters have been employed to connect an unbalanced element such as a coaxial transmission line to a balanced element. However, such devices are generally complicated, delicate, and have limited versatility. Furthermore, the presently available devices are limited usually, to a single operating frequency.

It is accordingly a general object of the invention to provide an improved line-balance converter.

It is another object of the invention to provide a symmetrical transmission line which while being relatively simple to fabricate, is also quite rugged and which may be used as a line-balance converter.

It is a further object of the invention to provide a symmetrical transmission line which can be used not only as a line-balance converter but also as a signal combining and selecting device.

Broadly, the invention contemplates at least two central conductors surrounded by a common outer conductor. The space between the central conductors and the common outer conductor is occupied by dielectric media. The dielectric medium surrounding one of the two central conductors is different from the dielectric medium surrounding the other central conductor so that notwithstanding the fact that the physical lengths of the two central conductors may be the same, their electrical lengths are different.

It should be noted that by a common outer conductor is meant an outer conductor that is electrically common to both central conductors. Accordingly, this could encompass a single outer conductor surrounding both central conductors and their dielectric media or two conductively connected outer conductors each surrounding respectively a single central conductor and its associated dielectric medium. Furthermore, a dielectric medium is meant to include both the material of the medium as well the geometrical region occupied by the medium. In other words, both dielectric media may have the same annular cross-section but may be made of different materials or have different densities in the same type of material, or both dielectric media may be made of the same material having the same density but their annular cross-sections may be different. For either of these cases the dielectric media are said to be different.

It should also be noted that since the electrical lengths of the two central conductors are different per unit of physical length it is possible to select a physical length of the symmetrical transmission line so that the electrical lengths differ by one half an operating wavelength. As is hereinafter more fully described, such a length of symmetrical transmission line is ideally suited for a line-balance converter.

Other embodiments of the invention are concerned with more than two central conductors so that signal combining and signal separating may be obtained.

Other features, objects, and advantages of the invention will be apparent from the following detailed description when read with the accompanying drawings, wherein.

Generally, the electrical length of a transmission line is related to the velocity of propagation of the electromagnetic wave energy down the line. Thus, for a given physical length of line the greater the velocity of propagation the shorter the electrical length of the line. It is known that propagation velociy in a coaxial line is influenced by the capacitance and/or inductance of the central conductor with respect to the outer conductor. Accordingly, the propagation velocity and its alter ego, electrical length, is readily adjusted through variation—singly or in combination—of the electrical properties (dielectric constant and permeability) of the dielectric meida or the geometry of the transmission line design (generally, the radial spacing between the central and outer conductors).

Figure 1:
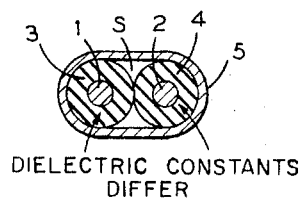
FIGURE 1 shows a cross-sectional view of a symmetrical transmission line in accordance with one embodiment of the invention.
Figure 2:
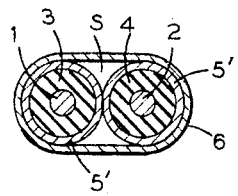
FIGURE 2 shows a cross-section view of a symmetrical transmission line in accordance with another embodiment of the invention.
Figure 3:
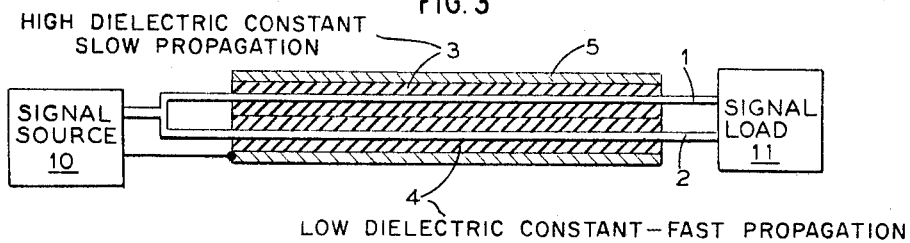
FIGURE 3 is a partial schematic diagram of an electromagnetic energy transfer system wherein an unbalanced signal source is connected to a balanced signal load by a line-balance converter symmetrical transmission line, shown in longitudinal section, in accordance with the invention.

In the drawing, and particularly FIGURES 1 and 3, is shown a two-conductor symmetrical trasmission line comprising central conductors 1, 2 and a common shield or common outer conductor 5. In FIG. 2, the central conductors 1 and 2 each have an individual outer conductor 5′ which in turn are conductively connected to a common conductive outer shield 6. The combination of outer conductors 5′ and outer shield 6 is a common outer conductor for the central conductors 1 and 2. Dielectric media 3 and 4 surround the central conductors 1 and 2. Through the selection of the dielectric media 3 and 4 with respect to the dielectric constant and/or permeability, the propagation velocity in, or the electrical length of the central conductors 1 and 2 can be differently adjusted. As a result, the relative phase of the central conductor-to-outer conductor voltages, i.e. the voltages of central conductors 1 and 2 with respect to outer conductor 5 or 5′ (partial voltages $V_{1-5}$ and $V_{2-5}$) varies steadily with increasing length of the transmission line. Through suitable adjustment of the phase difference, the legnth of the transmission line and the employed frequency range it is possible to obtain a difference of half an operating wavelength in the electrical lengths of central conductors 1 and 2 which causes a phase displacement of 180° between the partial voltages $V_{1-5}$ and $V_{2-5}$.

If such a transmission line, as shown in FIG. 3, is unsymmetrically fed by an unbalanced signal source 10, then, at the output of the transmission line two out of phase partial voltages $V_{1-5}$ and $V_{2-5}$ are created, the sum of which can be fed symmetrically to a balanced signal load 11. It should also be noted that if signal source 10 is a balanced source and signal load 12 is an unbalanced load then they can be interchanged; in which case the transmission line connects a balanced source to an unbalanced load. A transmission line as shown in FIG. 3 therefore can be used as a line-balance converter.

Figure 4:
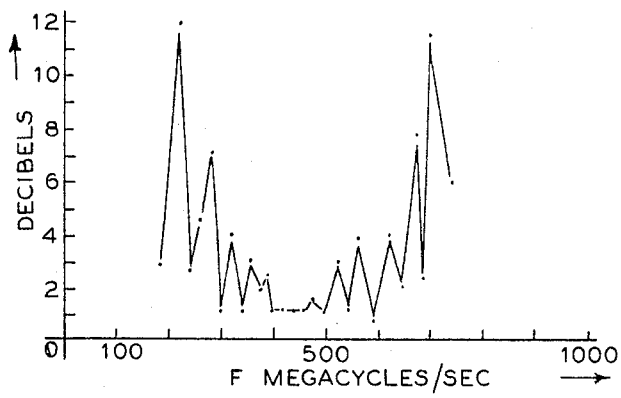
FIGURE 4 shows the typical frequency dependence of the attenuation for the symmetrical transmission line of FIGURE 3.

FIG. 4 shows the attenuation characteristic of a transmission line designed in accordance with the invention.

Figure 5:
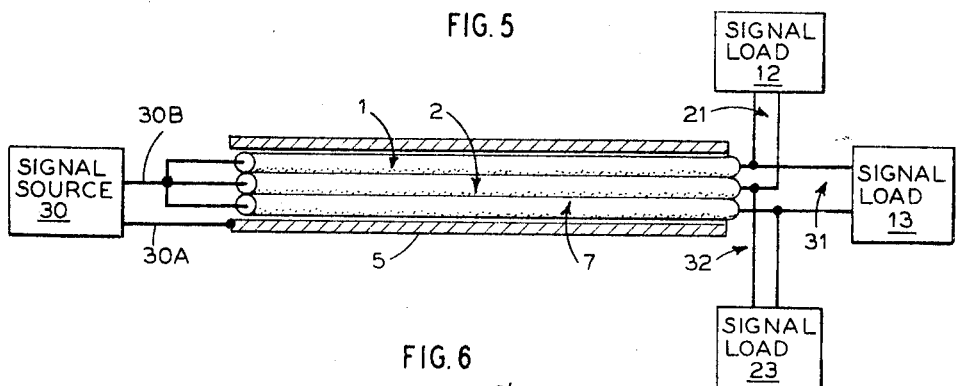
FIGURE 5 shows a diagrammatic representation of a symmetrical transmission line having more than two central conductors which can handle several signals having different operating wavelengths or frequencies.

When a third central conductor is added to a two central conductor transmission line, see FIG. 5, it is possible to obtain for the third central conductor, based on the same physical length, through the choice of the dielectric medium of the third central conductor, for a given frequency a phase difference of approximately 180° with respect to the first and second conductors. This determines in turn a second frequency or operating wave length at which an optimum phase difference of central conductor 3 with respect to central conductors 1 and 2 can be obtained.

More particularly, FIG. 5 shows a triple conductor transmission line made up of central conductors 1, 2, 7 and outer conductor 5. It is possible for a given length, through the choice of the dielectric media alone, to obtain both for central conductor pairs 1–2, 1–7 and 2–7 an optimum phase difference for three arbitrarily selected frequencies.

Thus, the electrical lengths $l_1$, $l_2$ and $l_3$ of central conductors 1, 2 and 7 are adjusted by appropriate choice of dielectric media to satisfy the following relations:

(1) $$l_1 - l_2 = n\frac{L_1}{2}$$

(2) $$l_1 - l_3 = n\frac{L_2}{2}$$

and (3) $$l_2 - l_3 = n\frac{L_3}{2}$$

wherein, $n$ = an integer
$L_1$ = a first operating wavelength
$L_2$ = a second operating wavelength
$L_3$ = a third operating wavelength Accordingly, an unbalanced signal source 30 transmitting electromagnetic waves having operating wavelengths $L_1$, $L_2$ and $L_3$ and having output terminals 30A and 30B can be connected to one end of the transmission line. The grounded output terminal 30A is connected to outer conductor 5 and the ungrounded output terminal 30B is connected to one end of each of the central conductors 1, 2 and 7. Three balanced signal loads 12, 13 and 23 respectively responsive to electromagnetic waves having operating wavelengths $L_1$, $L_2$ and $L_3$ are connected to the transmission line. In particular, the input terminals 21 of signal load 12 are connected to the other ends of central conductors 1 and 2; the input terminals 31 of signal load 13 are connected to the other ends of central conductors 1 and 7; and the input terminals 32 of load 23 are connected to the other ends of central conductors 2 and 7. In this way, the transmission line operates also as a signal frequency separator. It should be noted that signal load 12 can be replaced by a balanced signal source of operating wavelength $L_1$, signal load 13 replaced by a balanced signal source of operating wavelength $L_2$, signal load 23 by a balanced signal source of operating wavelength $L_3$, and signal source 30 by an unbalanced signal load. In this way, the transmission line also operates as a signal combining means.

The conditions are similar for transmission lines with four or more central conductors. In general, for each additional central conductor pair there will be another frequency which can be selected and for which an optimum phase difference can be obtained at the output end of the transmission line.

Figure 6:
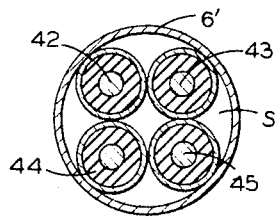
FIGURES 6 and 7 show cross-sectional views of multi-central conductor symmetrical transmission line according to further embodiments of the invention.

Lines with more than two central conductors, e.g. three central conductors 1, 2 and 7, can be arranged as in FIG. 5 with all conductors in a single horizontal plane; or with four central conductors 42, 43, 44 and 45, they can be grouped in a circle with an outer shield 6′, FIG. 6.

Figure 7:
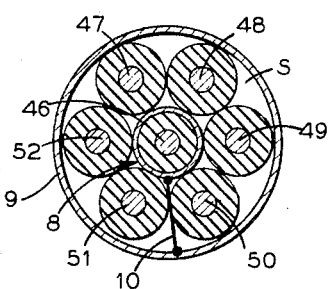

If there are several individually shielded central conductors, these can be arranged in concentric circular layers. The same procedure can be followed if the individual central conductors 46, 47, 48, 49, 50, 51 and 52 are not shielded, as shown in FIG. 7. However, in that case it is necessary to incorporate a conductive shield 8 between concentric layers and a conductive shield 9 around the outside layer, and to connect these shields by a conductive element 10. Accordingly, conductively connected conductive shields 8 and 9 can be considered as the common outer conductor of the central conductors.

Transmission lines in accordance with the invention have numerous applications. They are particularly suited for the symmetrical interconnection between two or more high-frequency systems of which one is of unsymmetrical and the other of symmetrical designs. This makes it possible to separate two different frequencies transmitted through a coaxial cable by means of a three or four central conductor transmission line, designed in accordance with the invention; the two frequencies being fed to two different devices or networks having a symmetrical input as described above. An example for such an application is in television receivers with two symmetrical inputs for two different programs, which are fed through a coaxial antenna lead. Conversely, it is possible to transmit two frequencies from two symmetrical lines through one coaxial cable.

An example of the invention is a line-balance converter which serves as a connection between two circuits of which one is unbalanced with respect to ground with an impedance of 60 ohms whereas the other is balanced with respect to ground with an impedance of 240 ohms. The line-balance converter is laid out in accordance with FIG. 2 and includes two individually shielded central conductors with an impedance of 120 ohms. Conductor 1 has a diameter of 0.4 mm., and conductor 2 has a diameter of 0.32 mm. Both are insulated with polyethylene foam. Through different degrees of foaming dielectric medium 3 of central conductor 1 has a dielectric constant of 1.47 whereas dielectric medium 4 of central conductor 2 has a dielectric constant of 1.72. Both conductors have an outer diameter over the dielectric medium of 4.3 mm. For a linear length of 3 meters the electrical length of the two central conductors, resulting from the different dielectric constants varies by about 30 cm.

FIGURE 4 shows the frequency dependence in megacycles per second of the attenuation in decibels for a matching network in accordance with FIG. 3.

The spaces S between the insulated conductors 1, 2; 42–45; 46–51, may be filled with electrically inert material such as cotton, or left as air spaces.

As various changes might be made in the embodiment of the invention herein disclosed without departing from the spirit thereof, it is understood that all matter herein shown or described shall be deemed illustrative and not by way of limitation except as set forth in the appended claims.

What is claimed is:

1. A symmetrical high-frequency electromagnetic wave energy transmission line comprising two spaced central conductors, a common outer conductor enclosing said central conductors and spaced therefrom, a first dielectric medium surrounding said first central conductor and occupying the space between said first central conductor and said outer conductor, and a second dielectric medium different from the first mentioned dielectric medium surrounding said second central conductor and occupying the space between said second central conductor and said outer conductor whereby the propagation velocity of electromagnetic wave energy transmitted by said first central conductor is different from the propagation velocity of electromagnetic wave energy transmitted by said second central conductor, the physical length of the transmission line being such that the electrical length of said first and second central conductors differ by an integral number of half operating wavelengths.

2. The transmission line of claim 1 wherein the first dielectric medium has a permeability different from the permeability of the second dielectric medium.

3. The transmission line of claim 1 wherein the first dielectric medium has a dielectric constant different from the dielectric constant of the second dielectric medium.

4. The transmission line of claim 1 wherein the cross-sectional area of said first dielectric medium is different from the cross-sectional area of said second dielectric medium.

5. The transmission line of claim 1 further including an unbalanced source of electromagnetic wave energy having first and second output terminals, means for connecting one of said output terminals to one end of each of said central conductors, means for connecting the other output terminal to said outer conductor, and also including a balanced electromagnetic wave energy load having first and second input terminals, means for connecting one of said input terminals to the other end of one of said central conductors and means for connecting the other of said input terminals to the other end of the other of said central conductors whereby said transmission line connects an unbalanced source to a balanced load.

6. The transmission line of claim 1 further including a balanced source of electromagnetic wave energy having first and second output terminals, means for connecting one of said output terminals to one end of one of said central conductors, means for connecting the other of said output terminals to one end of the other of said central condutors, and also including an unbalanced electromagnetic wave energy load having first and second input terminals, means for connecting one of said input terminals to the other ends of said central conductors and means for connecting the other of said input terminals to said outer conductor whereby said transmission line connects a balanced source to an unbalanced load.

7. A symmetrical high-frequency electromagnetic wave energy transmission line comprising at least three spaced central conductors, a common outer conductor spaced from and surrounding said central conductors, a first dielectric medium surrounding said first central conductor, the properties of said first dielectric medium being such that the electrical length of said first conductor is $l_1$, a second dielectric medium surrounding said second central conductor, the properties of said second dielectric medium being such that the electrical length of said second central conductor is $l_2$, and a third dielectric medium surrounding said third central conductor, the properties of said third dielectric medium being such that the electrical length of said third central conductor is $l_3$, wherein $l_1$, $l_2$, and $l_3$ have values different from each other.

8. The transmission line of claim 7 wherein the electrical lengths $l_1$, $l_2$, and $l_3$ satisfy the following relations:

$$l_1 - l_2 = n\frac{L_1}{2}$$

$$l_1 - l_3 = n\frac{L_2}{2}$$

$$l_2 - l_3 = n\frac{L_3}{2}$$

wherein
$n =$ an integer
$L_1 =$ a first operating wavelength
$L_2 =$ a second operating wavelength
$L_3 =$ a third operating wavelength.

9. The transmission line of claim 8 further including a balanced source of electromagnetic wave radiation having components with operating wavelengths $L_1$, $L_2$ and $L_3$, said balanced source including first and second outputs, means for connecting one of said outputs to said outer conductor, means for connecting the other of said outputs to one end of said first, second and third central conductors, first, second and third balanced electromagnetic wave energy loads each having first and second inputs, means for connecting one input of said first load to the other end of said first central conductor, means for connecting the other input of said first load to the other end of said second central conductor, means for connecting one input of said second load to said other end of said first central conductor, means for connecting the other input of said second load to the other end of said third central conductor, means for connecting one input of said third load to said other end of said second central conductor, and means for connecting the other input of said third load to said other end of said third central conductor whereby said first load receives electromagnetic waves having an operating wavelength $L_1$, said second load receives electromagnetic waves having an operating wavelength $L_2$ and said third load receives electromagnetic waves having an operating wavelength $L_3$.

10. The transmission line of claim 8 further including a first balanced source of electromagnetic wave radiation of operating wavelength $L_1$ having first and second outputs, a second balanced source of electromagnetic wave radiation of operating wavelength $L_2$ having first and second outputs, a third balanced source of electromagnetic wave radiation of operating wavelength $L_3$ having first and second outputs, means for connecting a first output of said first source to one end of said first central conductor, means for connecting the second output of said first source to one end of said second central conductor, means for connecting the first output of said second source to said one end of said first central conductor, means for connecting the other output of said second source to one end of said third central conductor, means for connecting one output of said third source to said one end of said second central conductor, means for connecting the other output of said third source to said one end of said third central conductor, an unbalanced electromagnetic wave radiation load having first and second input terminals, means for connecting one of said input terminals to said outer conductor, and means for connecting the other input terminal to the other ends of each of said central conductors whereby said load receives signals having operating wavelengths $L_1$, $L_2$ and $L_3$.

11. A symmetrical high-frequency electromagnetic wave transmission line comprising a plurality of elongated spaced central conductors disposed in at least two concentric circular layers, a different dielectric medium surrounding at least some of said central conductors, a common outer conductor surrounding said dielectric media, a common intermediate conductor means disposed between each of said concentric layers and conductive means for connecting said common intermediate conductor means to said common outer conductor whereby at least some of said central conductors have different electrical lengths.

References Cited by the Examiner
UNITED STATES PATENTS

| | | | |
|---|---|---|---|
| 529,559 | 11/1894 | Marsh | 174—112 |
| 1,978,418 | 10/1934 | Dudley | 333—96 |
| 2,597,853 | 5/1952 | Coleman | 333—26 |

HERMAN KARL SAALBACH, *Primary Examiner.*

E. LIEBERMAN, A. R. MORGANSTERN, M. NUSSBAUM, *Assistant Examiners.*